United States Patent Office 3,472,628
Patented Oct. 14, 1969

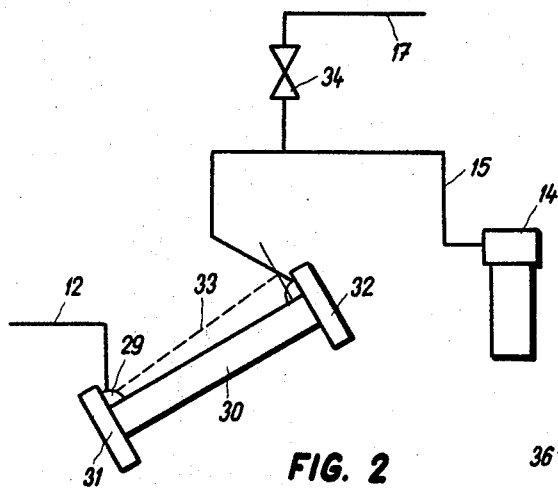
FIG. 2
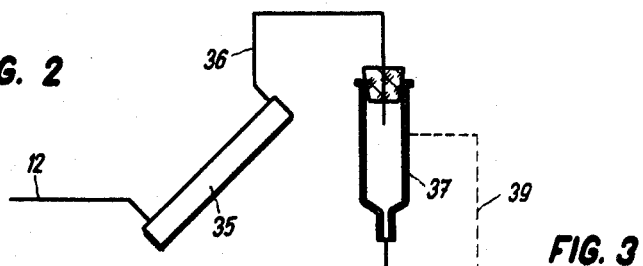
FIG. 3
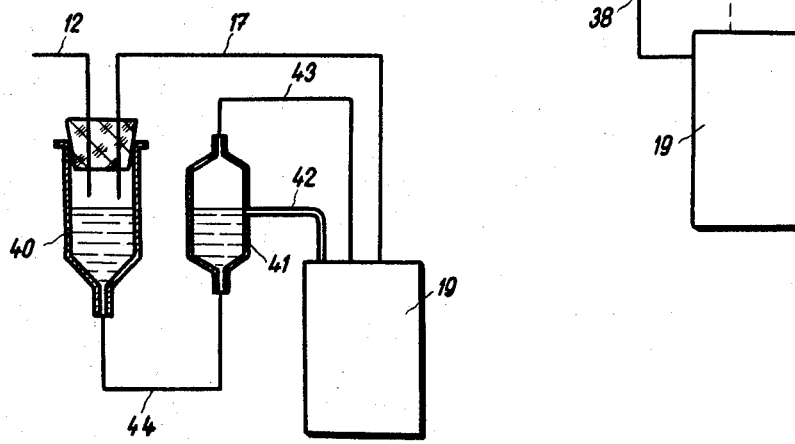
FIG. 4
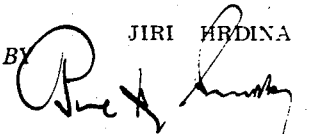

3,472,628
APPARATUS AND PROCESS FOR MAINTAINING UNIFORM SIZE OF GAS BUBBLE PISTONS IN CAPILLARY THROUGH FLOW REACTORS
Jiří Hrdina, Prague, Czechoslovakia, assignor to Ceskoslovenska akademie ved, Prague, Czechoslovakia, a corporation of Czechoslovakia
Filed June 13, 1967, Ser. No. 651,089
Int. Cl. G01n 33/00
U.S. Cl. 23—230    11 Claims

ABSTRACT OF THE DISCLOSURE

In a system wherein a liquid stream is separated into uniform longitudinal segments by means of separating gas bubble pistons, treated at an elevated temperature in a capillary reactor tube and then analyzed in a measuring cell, improved results are obtained by maintaining it at an elevated pressure to repress undesirable evaporation of the liquid into the bubble pistons. A container of gas maintained at the desired elevated pressure serves as a source of high pressure gas which is used to form the bubble pistons in the stream before it enters the reaction tube and to maintain the reaction tube and measuring cell at the desired pressure.

BACKGROUND OF THE INVENTION

With certain kinds of apparatus used in modern laboratory techniques, particularly with highly efficient analyzers of amino acids and mixtures of like substances, the continuous flow of the liquid to be analyzed, as for instance an eluate flowing from a chromatographic column, is split lengthwise into a series of strictly uniform sections separated from one another by so called gas bubble pistons. The liquid of which the continuous flow has been interrupted in such a way is then led through a reaction capillary tube where it is subjected to a relatively protracted reaction for, say, ten minutes, at an elevated temperature maintained by means of a heating bath in which the operative length of the reaction capillary tube is submerged. The liquids, as above referred to, are as a rule aqueous solutions having boiling points different from 100° C. and so the respective reactions have to be performed for the aforesaid period at temperatures approaching 100° C. Under these circumstances considerable evaporation of the reaction mixture into the interior of the individual gas bubble pistons may occur if special precautions are not taken to prevent this effect.

With some well-known kinds of apparatus of the described type such precautions consist in maintaining the reaction temperature, for instance, at a value of 5° C. below the boiling point of the reaction mixture, at the atmospheric or other pressure prevailing in the reaction capillary tube. This, however, results in two drawbacks. Firstly, even a slight drop of the reaction temperature is apt to be reflected in a considerable loss in reaction rate, and secondly, special thermostatic means are required for maintaining the temperature of the heating bath.

In another well-known apparatus the reaction temperature is maintained at a value of 100° C. by boiling distilled water in a heating vessel of the reactor system at the atmospheric pressure and slightly raising the pressure prevailing in the reaction capillary tube by arranging the capillary tube outlet in a higher position, say, one yard above the level of the liquid contained in the capillary tube; the overpressure so produced of about 0.1 atm. is sufficient to suppress substantially the evaporation and undesirable effects resulting therefrom. Nevertheless, the last mentioned method is suitable only for less efficient apparatuses which do not necessarily require the existence of separating gas bubble pistons. With the laboratory apparatus designed for the purposes of the present invention the gas bubble pistons are forced with high precision by means of a particular pump into the liquid flow which is to be divided into precisely uniform longitudinal segments. The last mentioned apparatus suffices for suppressing an undesirable expansion of the bubbles arising in this instance rather spontaneously, since a sufficient rate of arrestation of the solutions to be analyzed can hardly be obtained in practice so that at a raised temperature a spontaneous liberation of gases therefrom occurs which results in the production of unevenly sized bubbles.

Moreover, the apparatus as hereinbefore set forth are not serviceable for cases where the liquid divided into sections by said gas bubble pistons has to pass a measuring cell of, for instance, an evaluating photometric analyzer, the passage of said gas bubble pistons being inadmissible without using some special devices, which keep the bubbles from disturbing the mostly periodical measurements in the cell. On the contrary, the presence of the bubbles need not necesarily make difficulties with less precise kinds of apparatus where a linear recorder continuously or permanently records photometric signals regardless to the presence of gas bubbles passing sporadically through the measuring zone. With well-known apparatuses, however, the bubbles are separated from the liquid volume by means of special separating means before entering the photometer whereupon the bubble free liquid is introduced into the measuring portion of the cell. In this case, however, the concentration gradients are undesirably disturbed. With other known apparatuses it is not only desired to make a precise evaluation of sharp concentration gradients, as in the case of modern amino acid analyzers, but, on the contrary, an advantage is seen in that after the separation of the gas bubbles the liquid is mixed to some extent before it has entered the measuring portion of the cell whereby some troubles resulting from the production of uneven sections, into which the flow of liquid has been divided, are considerably compensated.

The drawbacks found in the well-known apparatuses, as hereinbefore set forth, prevent the same from being used for highly efficient amino acid analyzers where individual strictly uniform sections of liquid flow defined by said gas bubble pistons are to be evaluated one after another. An essential feature of such analyzers is that each fluid section has to be analyzed therein separate and prevented from fusing with another. Maintaining strictly uniform size of the separating gas bubble pistons has not been a major problem with the older apparatuses, but it is a most serious problem with modern highly efficient analyzers and the like where all the aforesaid disturbing effects which impair the separation efficiency have to be reduced to a minimum. Moreover, the strictly uniform size of the gas bubble pistons is necessary to secure a precise determination of the interval of passage of a section through the capillary reactor. Only the precision of such a passage interval combined with evenly separated flow of liquid supplied by means of precisely operating pumps can guarantee the precise determination of the degree of, for example, a color generating reaction.

The apparatus according to the present invention is particularly advantageous in such cases where, for instance, the flow of reaction mixture divided into uniform sections is to be evaluated in a photometric cell having forced draw-off. In such photometers a single section between two gas bubble pistons, or at most two adjacent fused sections of the respective reaction mixture are evaluated at once. In a forced draw-off cell the reaction mixture to be evaluated flows up to the cell in a divided condition whereupon in the interior thereof the dividing gas bubble pistons are separated therefrom, just after a fluid section has entered the cell and filled up its operative capacity. Thereafter, the proper photometric measurements can be performed whereupon the liquid is exhausted from the lowermost portion of the cell, and the entire measuring cycle can be repeated. Thus, not only the whole evaluated liquid volume is removed from the cell but also all remnants of the reaction mixture adhered to the inner walls thereof are expelled, due to the fact that in each cycle a certain volume of gas contained above the level of the reaction mixture in the cell is exhausted together with the liquid. The last mentioned gas volume, however, has to be maintained under a pressure which substantially equals the pressure prevailing in the entire pipeline system attached to the operative parts of the capillary reactor, excepting some deviations caused by hydrodynamic and capillary phenomena arising during advancement of the liquid flow divided into sections by the gas bubble pistons, through the system. In this phase, it is necessary for the reasons set forth above to prevent the high reaction temperature from causing an excessive evaporation of the reaction mixture and to prevent the entry of the resulting vapors into the interior of the gas bubble pistons. These vapors would cause the gas bubble pistons to become undesirably inflated in volume and make it impossible to maintain their size constant.

DESCRIPTION OF THE INVENTION

The apparatus and process of the present invention makes it possible, even with aqueous solutions having boiling points approaching a temperature of 100° C. and with keeping said solutions in the reaction capillary tube at the temperature of about 100° C. by means of a heating bath, to maintain the size of the individual gas bubble pistons such that the ratio of their volume to that of individual liquid sections is relatively small, that is, the volume of a bubble piston is substantially only a minor fraction of that of a liquid section. The apparatus and process according to the invention further permits maintaining the size of the gas bubble pistons at a quite precise constant value even when a system involves undesirable effects of capillary forces which act on a plurality of crescent-like boundary zones being displaced together with the liquid flow. In such cases some negative phenomena of capillary forces acting on the flow of liquid cannot be normalized with an absolute precision. However, the gist of the invention lies in maintaining the pressure in the capillary tube of the reactor, the measuring cell, and the entire pipeline system attached thereto at a higher value relative to the pressure of vapors of the reaction mixture in the capillary tube of the reactor, i.e., at the respective reaction temperature kept up by means of the heating bath. The pressurizing is effected according to a predetermined program, either permanently or in certain programmed impacts.

The present invention provides an improved apparatus for maintaining a uniform size of gas bubble pistons in capillary through-flow reactors at raised temperatures which apparatus comprises a pressurized gas container adapted to maintain, either permanently, or in programmed impacts, a superatmospheric pressure in a reaction capillary tube and in a measuring cell relative to the pressure of the vapor of a mixture caused to react in said tube at a temperature maintained by means of a heating bath of the reactor.

The apparatus according to the invention comprises further an airtight pipeline system providing the communication between the reaction capillary tube, the measuring cell and the pressurized gas container, the pressure in said pressurized gas container being produced due to a hydrostatic pressure of a liquid contained in a water jar arranged at a higher elevation relative to the pressurized gas container.

The apparatus is preferably provided with a second pressurized source of another, preferably inert gas, said source in the form of a receptacle with elastic walls being adapted, with the aid of a mixing device to form uniformly batched gas bubble pistons dividing the originally continuous flow of the reaction mixture into uniform elongated sections.

Another feature of the invention consists in the provision of a reducing valve in the pipeline connecting the measuring cell with the pressurized gas container.

Another feature of the invention consists in the provision of a closed separating vessel into which the pipeline delivering the liquid flow containing the gas bubble pistons from the measuring cell discharges, the separating vessel communicating via one or more pipelines with the pressurized gas container. The separating vessel communicating with the measuring cell, preferably a photometric cell, is connected via a separate pipeline with the pressurized gas container, the measuring cell communicating with the latter via overflow pipeline and/or another pipeline.

BRIEF DESCRIPTION OF THE DRAWINGS

The manner in which the invention may be carried into effect is hereinafter described in greater detail with reference to the accompanying diagrammatic drawings in which FIGS. 2 to 4 are detailed views showing by way of example some embodiments of particular parts of the apparatus.

DESCRIPTION OF SPECIFIC EMBODIMENTS

Figure 1:
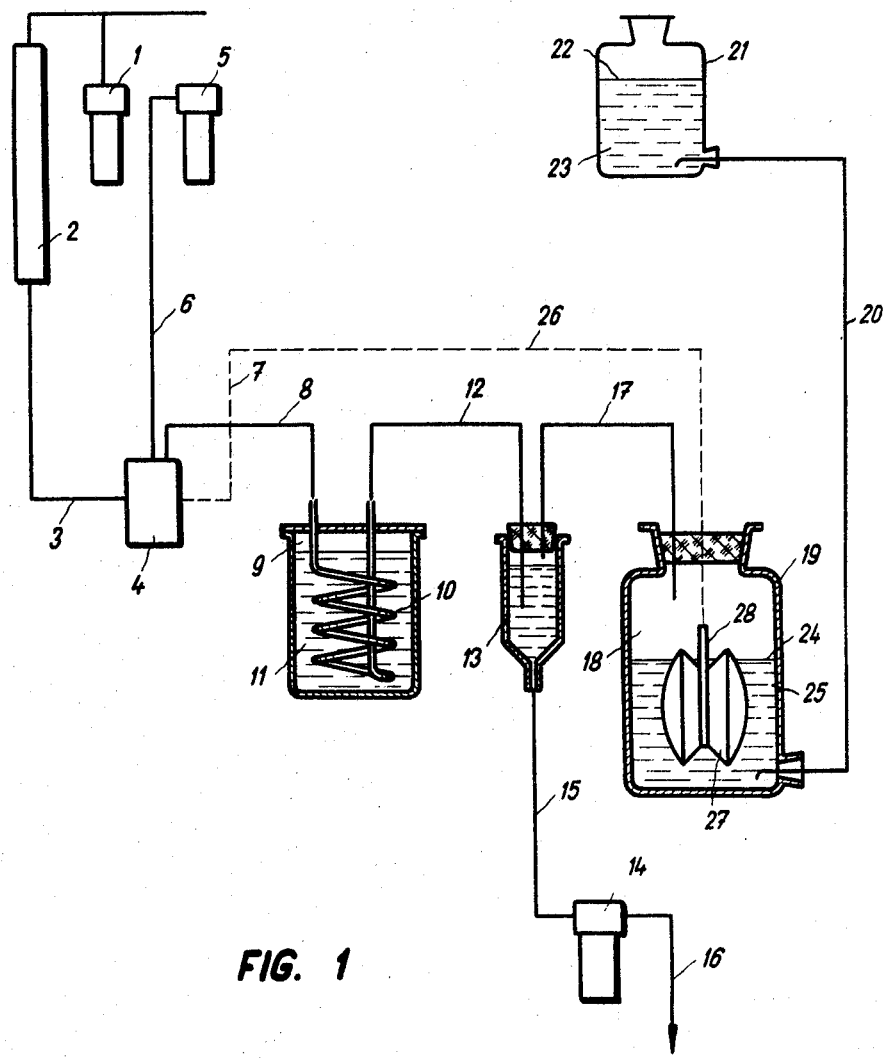
FIG. 1 is a side elevation of the apparatus according to the invention showing schematically by way of example a complex of operative parts of an efficient analyzing unit for the analysis of amino acids and like substances.

With reference to FIG. 1 pump 1 forces the eluent into column 2. The eluate flowing out of column 2 through pipeline 3 carries along with it the individual components of the mixture to be analyzed, already separated from one another. This eluate enters then a mixing device 4 where it is mixed with a reagent supplied by pump 5 through pipeline 6. Simultaneously, when the continuous eluate flow has been mixed with the reagent it is divided into distinct elongated uniform sections which are separated from one another by gas bubble pistons. The gas necessary for producing these gas bubble pistons is supplied through pipeline 7 (shown in FIG. 1 in dashed line). The liquid flow divided by means of gas bubble pistons into the aforesaid strictly uniform elongated sections is then supplied through a capillary tube 8 to reactor 9, the essential reacting part of which in the form of a capillary tube 10 is submerged beneath the level of liquid 11 representing the heating bath. After the reaction in reactor 9 has been completed the flow of the liquid, still divided by the gas bubble pistons into uniform sections, is delivered through pipeline 12 to the evaluating device comprising a photometric cell 13 the content of which is forcedly emptied or exhausted through pipeline 15 by means of the periodically operated pump 14 and finally drained off at 16. In each cycle the cell 13 is filled with a fresh charge of liquid. Above the level of the liquid there is a gas 18 kept under a constant pressure by means of a pressurized gas container 19 communicating with the upper portion of cell 13 by the intermediary of pipeline 17.

In this manner a superatmospheric pressure is maintained not only in cell 13 but also in the entire pipeline system 8, 10 and 12, which pressure is sufficient to suppress, even in the heated part of the capillary tube 10, an excessive evaporation of the liquid content into the interior of the particular gas bubbles. Thus a predetermined size of the gas bubble pistons can be preserved in the heated part of the capillary tube 10 and also in other parts of the attached pipelines, though this size may differ in zones of different temperatures. In no event, however, can an excessive inflation of the gas bubbles occur and consequently impair the precision of the analyzer, due to the factors set forth in the introductory part of the present specification. The necessary superatmospheric pressure of gas 18 in the pressurized gas container 19 represented for instance by a glass vessel is maintained by a hydrostatic pressure of a water column contained in pipeline 20 of a suitable length connecting container 19 with a water jar 21, the level 22 of the liquid content 23 therein being sufficiently elevated above the level 24 of the liquid content 25 in the pressurized gas container 19.

With the aim of adjusting the mixing device 4, comprising a special pumping means for forcing strictly uniform gas bubble pistons into the liquid flow, so as to operate as precisely as possible, said device 4 should preferably be fed with the gas to produce the gas bubble pistons under the same, or very similar pressure as that prevailing in the entire pipeline system downstream from said device 4 as well as in cell 13. This may be achieved by connecting the pipeline 7, which supplies the gas to produce the gas bubble pistons, with the pipeline 26 (drawn in dashed line in FIG. 1) communicating with the interior of the gas container 19.

If it is required to produce the gas bubble pistons from a particular kind of gas, such as a very pure gas or an absolutely inert gas, such as nitrogen or argon used for filling electric bulbs, the entire space above the level in the gas container 19 can be filled with such a gas. Otherwise, as schematically shown in FIG. 1, it is possible to fill this space with any arbitrarily selected gas, such as air which will fully suffice for maintaining the overpressure in cell 13 and thereby also in the pipelines connected therewith whereas the gas designed for producing the gas bubble pistons should be contained in a suitable separate receptacle having resilient walls, as for instance in an elastic sport ball bladder 27 discharging at 28 into the pipeline 26.

Another embodiment of the apparatus according to the present invention is shown schematically in FIG. 2. The flow of liquid divided lengthwise into sections by the gas bubble pistons is supplied from reactor 9 (not shown in FIG. 2) into an inlet lobby or disengaging space 29 of the cell 30, which cell 30 is provided with a longitudinal inspection slit and closed at both faces by two transparent lids 31 and 32, respectively. The gas bubble pistons are trapped temporarily in said inlet lobby 29 of cell 30 without following the liquid flow into the interior of the cell 30. Thus the inner space of cell 30 to be optically inspected is not blocked by the presence of the gas bubbles. If the capacity of the cell inlet lobby 29 is a little larger than the volume of the individual gas bubbles no mixing can occur before the flow has attained the interior of the cell 30. The gas bubbles are then exhausted out of the cell inlet lobby or disengaging space via pipeline 33 (shown in dashed line) into the common drain pipeline 15 and led to the periodically operated pump 14, as hereinbefore described with reference to FIG. 1. In this instance, however, cell 30 communicates with the pressurized gas container 19 via capillary pipeline 17, a forced intake of the gaseous medium being controlled by a reducing valve 34. With the aid of the arrangement described an average uniform pressure condition can be maintained in the cell 30 and in the pipeline 12, which pressure is determined substantially by the pressure prevailing in the capillary tube 17, or in the pressurized gas container 19, respectively, because the reducing valve 34 allows liquid to pass in the event of protracted pressure changes. The reducing valve 34, however, blocks the liquid flow substantially or completely in the case of the short-period pressure fluctuations periodically produced by the operation of pump 14. This has the purpose of economically utilizing the reacted liquid in the individual consecutive charges coming from cell 30 and also has the purpose of producing the dynamic effect necessary to expel the gas bubbles in phase with the produced pressure differences from the cell inlet lobby 29 via pipeline 33 to the drain pipeline 15. In this period one must overcome the capillary forces which prevent under the circumstances the individual gas bubbles from advancing spontaneously through pipeline 33 which communicates with the drain pipeline 15.

A further embodiment of a detail of the apparatus according to the invention is shown by way of example in FIG. 3. The flow of liquid divided lengthwise into sections by the gas bubble pistons is supplied via pipeline 12 to cell 35 through which the liquid passes along with the dividing gas bubble pistons to the drain pipeline 36 communicating with a closed separating vessel 37. Therefrom the liquid is let off through pipeline 38 to the pressurized gas container 19 corresponding for instance to that described with reference to FIG. 1. The gaseous content of the separating vessel 37 may pass moreover via pipeline 39 (shown in dashed line) to the pressurized gas container 19 as well. The superatmospheric pressures maintained in the interior of the separating vessel 37 and in the gas container 19 are substantially alike, said separating vessel 37 being optionally positioned higher than the container 19 so that an overpressure resulting from the communication of the vessel 37 with the container 19 may arbitrarily be combined with the hydrostatic pressure obtained by establishing a level difference between the two receptacles, as hereinbefore referred to.

Another embodiment of the arrangement of the apparatus is shown schematically in FIG. 4. The flow of the liquid divided by gas bubble pistons into elongated sections is again supplied through pipeline 12 into the upper portion of the separating vessel 40 communicating via pipeline 44 with the interior of the photometric cell 41. Pipeline 17 discharges into the upper portion of said separating vessel 40 which is cut off from the ambient atmosphere, which pipeline 17 connects the separating vessel 40 with the pressurized gas container 19, substantially as hereinbefore described. The closed space of the photometric cell 41 communicates by the intermediary of an over-flow pipeline 42 of sufficient capacity with the pressurized gas container 19 as well. Thus it may be assured that the level of the interior of the cell 41 will practically be aligned with the mouth of said over-flow pipeline 42, particularly when the upper portion of the photometric cell 41 also communicates via another pipeline 43 with the pressurized gas container 19. The liquid can be withdrawn from the separating vessel 40 via connecting pipe 44 into the photometric cell 41 until its level therein is aligned with the mouth of the over-flow pipeline 42. This enables the liquid volume supplied through pipeline 12 to be uninterruptedly passed from the separating vessel 40 into the interior of the cell 41 in the lower portion of which the photometric measurements take place.

Some principal elements of the embodiments shown in FIGS. 3 and 4 are known per se. The gist of the apparatus according to the present invention, however, consists in that unlike the previous art where the interior of the separating vessel and the measuring cell communicates with the ambient atmosphere, said spaces in our case are cut off therefrom and maintained by means of the respective communicating pipelines under a superatmospheric pressure, enabling the elimination of all the negative effects referred to in the introductory part of the specification, and which cause a production of excessive and practically uncontrollable gas bubble sizes, particularly in the raised temperature zones the liquid is forced to flow through.

I claim:
1. Improved apparatus for maintaining a uniform size of gas bubble pistons dividing a liquid stream of reaction mixture into segments in a capillary through-flow reactor operating at an elevated temperature which apparatus comprises a capillary tube reactor, a heating means adapted to maintain said capillary tube reactor at a preselected elevated temperature, a photometric cell communicating with and downstream of said reactor, and a pressurized gas container communicating with and adapted to maintain according to a predetermined program a predetermined super-pressure in said capillary tube and in said measuring cell, said super-pressure being designed to reduce evaporation of the reaction mixture into the said gas pistons.

2. Apparatus as claimed in claim 1 comprising a gas-tight pipeline system providing communication between the capillary tube, the measuring cell and the pressurized gas container.

3. Apparatus as claimed in claim 1 wherein the pressurized gas container is adapted to contain a liquid in the lower portion and gas in the upper portion thereof and communicates with a second container which is adapted to contain a liquid and is arranged at an elevation above said pressurized container so as to apply a hydrostatic head to the pressurized container and compress the gas therein.

4. Apparatus as claimed in claim 1 which additionally comprises a separate pressurized vessel containing another gas and adapted to form the gas bubble pistons dividing said stream of reaction mixture into uniform elongated sections.

5. Apparatus as claimed in claim 4 comprising a mixing device adapted to produce said uniformly batched gas bubble pistons from said other gas supplied through a suitable pipeline from said separate pressurized vessel.

6. In combination with a chromatograph column, apparatus as claimed in claim 4 wherein said separate pressurized vessel has elastic walls and is contained within the first said pressurized container.

7. Apparatus as claimed in claim 2 wherein the pipeline connecting the measuring cell with the pressurized gas container comprises a reducing valve.

8. Apparatus as claimed in claim 2 wherein the pipeline delivering the liquid stream containing the gas bubble pistons to the measuring cell first discharges into a closed separating vessel adapted to separate the gas bubble pistons from the liquid stream and communicating from an upper portion via at least one pipeline with the pressurized gas container and communicating from a lower portion with said measuring cell.

9. Apparatus as claimed in claim 8 wherein the measuring cell is a photometric cell, the separating vessel communicating with said photometric cell is connected via a separate pipeline with the pressurized gas container, and the photometric cell communicates with said pressurized gas container via over-flow pipeline and/or another pipeline.

10. In a process wherein a liquid stream which is initially at a relatively low pressure is mixed in a mixing zone with a gas to divide said stream into uniform longitudinal liquid segments separated by gas bubble pistons and the resulting stream is treated in a capillary reaction zone at an elevated temperature which is lower than the boiling point of the liquid and the treated stream is passed to a measuring zone for determination of one of the properties of the liquid after separation of the gas therefrom, the improvement which comprises maintaining gas at a relatively high pressure in at least one high pressure zone, and maintaining said reaction zone and said measuring zone substantially at said relatively high pressure by supplying gas from the high pressure zone to the mixing zone to form the said gas bubble pistons therefrom and supplying said gas from said high pressure zone also to said measuring zone to maintain the liquid therein substantially at said relatively high pressure.

11. A process according to claim 10 which comprises maintaining two different gases in two separate high pressure zones, the gas from one of these high pressure zones being supplied to said mixing zone and the gas from the other high pressure zone being supplied to said measuring zone;

maintaining a body of liquid under a preselected hydrostatic head in one of said high pressure zones to exert the desired pressure on the gas therein; and maintainnig the second high pressure zone inside the first high pressure zone, the second high pressure zone being resilient such that the gas therein is maintained at substantially the same pressure as the first high pressure zone.

References Cited

UNITED STATES PATENTS 3,186,235  6/1965  Ferrari _____ 23—253 XR

MORRIS O. WOLK, Primary Examiner

R. M. REESE, Assistant Examiner

U.S. Cl. X.R.

23—253; 137—1